United States Patent [19]

Cox

[11] Patent Number: 4,935,250
[45] Date of Patent: Jun. 19, 1990

[54] COATED FISH FEED PELLETS

[75] Inventor: James P. Cox, Lynden, Wash.

[73] Assignee: Inverness Management Corporation, New York, N.Y.

[21] Appl. No.: 374,596

[22] Filed: Jun. 30, 1989

Related U.S. Application Data

[63] Continuation-in-part of Ser. No. 5,391, Jan. 9, 1987, abandoned, which is a continuation-in-part of Ser. No. 606,064, May 1, 1984, abandoned.

[51] Int. Cl.$^5$ .......................... A21D 2/00; A23K 1/18
[52] U.S. Cl. ...................... 426/94; 426/303; 426/305; 426/805
[58] Field of Search ................ 426/1, 303, 305, 573, 426/577, 805, 454, 89, 94

[56] References Cited

U.S. PATENT DOCUMENTS

| | | | |
|---|---|---|---|
| 2,827,376 | 3/1958 | Breuer | 426/1 |
| 2,932,572 | 4/1960 | Sarich | 426/1 |
| 3,864,498 | 2/1975 | Whitmore et al. | 426/1 |
| 4,212,890 | 7/1980 | Tiefenbacher et al. | 426/454 |
| 4,400,399 | 8/1983 | Muller | 426/1 |

FOREIGN PATENT DOCUMENTS

| | | | |
|---|---|---|---|
| 0048123 | 3/1982 | European Pat. Off. | |
| 2753416 | of 1979 | Fed. Rep. of Germany | |
| 3125896 | of 1983 | Fed. Rep. of Germany | |
| 53-38596 | 4/1978 | Japan | 426/1 |
| 95894 | of 1960 | Norway | |
| 586157 | 11/1943 | United Kingdom | |
| 1579324 | 2/1976 | United Kingdom | |
| 1604381 | of 1981 | United Kingdom | |

*Primary Examiner*—George Yeung
*Attorney, Agent, or Firm*—Robert W. Beach; Ward Brown

[57] ABSTRACT

Palatability of fish feed pellets is increased by coating preformed pellets with a coating of soft and flexible consistency that may be formed of alginate or guar gum set by calcium chloride solution or may incorporate gum tragacanth, pectin or gelatin.

25 Claims, 1 Drawing Sheet

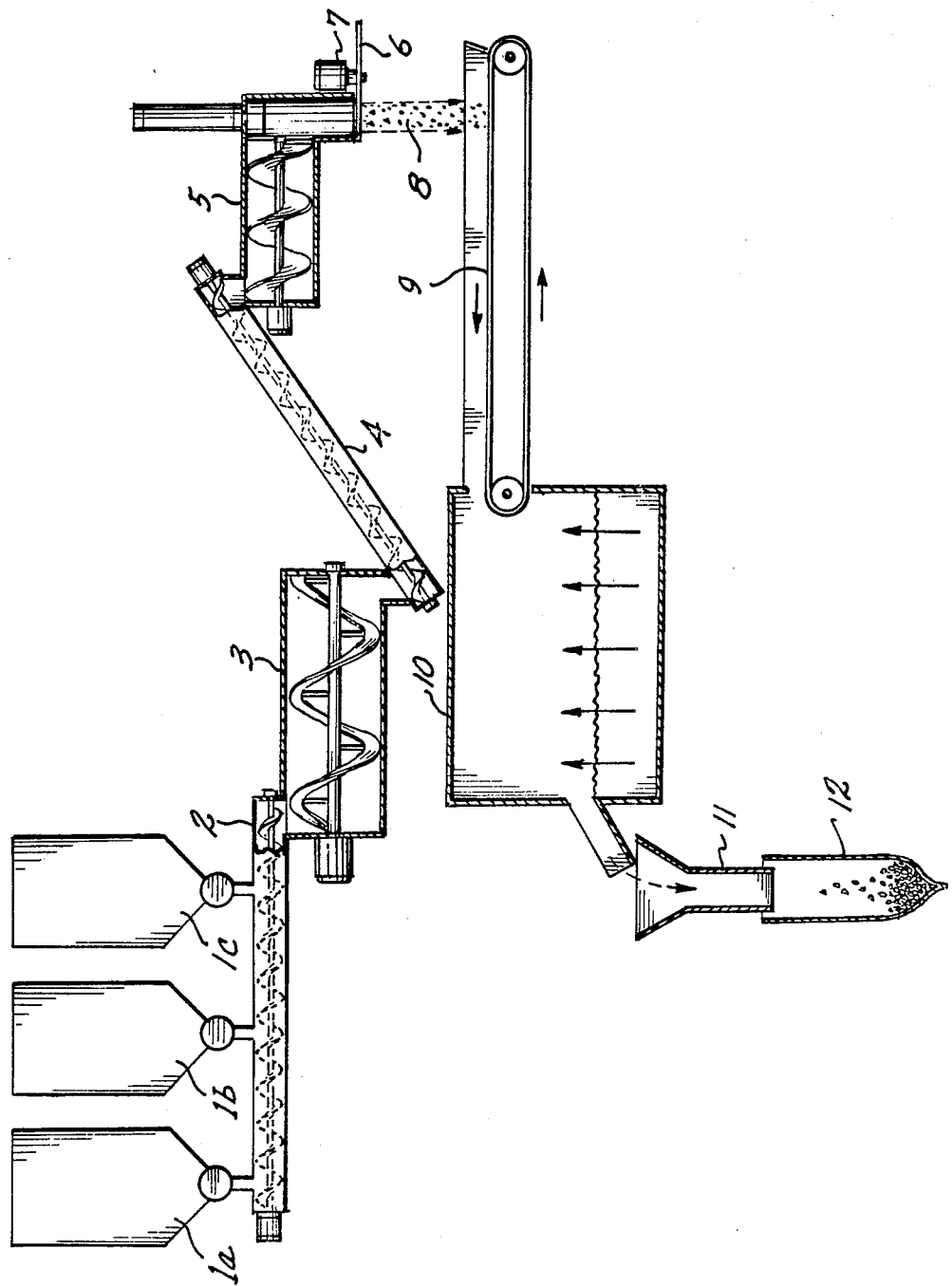

COATED FISH FEED PELLETS

CROSS REFERENCE

This is a continuation-in-part of my co-pending application Ser. No. 07/005,391, filed Jan. 9, 1987, now abandoned, which is a continuation of my application Ser. No. 606,064 filed May 1, 1984 now abandoned.

BACKGROUND OF THE INVENTION

1. Field of the Invention

This invention relates to feed pellets for marine animals including fish and to the process for making the same.

2. Problem

In the past there has been considerable waste of fish food supplied for feeding fish in rearing tanks and ponds in fish hatcheries and fisheries because of one or more undesirable characteristics of the fish food. When the fish food is supplied in pellet form, the pellets may be so hard as to be unpalatable to the fish and, consequently, rejected by them. On the other hand, the pellets may be so soft or friable that they disintegrate or dissolve so quickly that they become largely unavailable for fish food. Other pellets are so hard and dense that they sink to the bottom of the tank or pond where they are not readily available to the fish.

Another disadvantage of prior fish feed pellets is that they deteriorated undesirably quickly, particularly if they were not refrigerated. Other pellets contained less fat or oil than was desirable in order to make them less subject to disintegration.

The result of the use of such prior pellets was that a substantial amount of the fish food was unavailable to the fish and such unavailable portion of the fish food served to enrich or fertilize the tanks or ponds so as to promote the growth of algae and aquatic vegetation which is undesirable in rearing tanks or ponds.

PRIOR ART

Previous attempts have been made to provide a softer pellet which would be more palatable to fish. Such softer texture, however, usually was provided by increasing the moisture content which increased the problem of disintegration and dissolution of the pellet material and further tended to promote deterioration of the pellet material prior to use and, consequently, shortened the shelf life of the pellets. If the pellets were dispensed in frozen condition for preservation and to deter disintegration, special apparatus was required to distribute the pellets over the water.

SUMMARY OF THE INVENTION

It is a principal object of the present invention to provide a feed pellet for marine animals, including fish, which is coherent and does not readily disintegrate either in dry form or in water and which, while firm, has a surface that is soft and flexible, making the pellet palatable to fish.

A further object is to enable the degree of firmness of the pellet consistency to be varied and to enable the moisture content and/or the oil or fat content to be greater than previously provided without adversely affecting the texture or keeping qualities of the pellet.

Another object is to provide a pellet which is durable and will not deteriorate appreciably throughout a long period prior to use even though it is not frozen or refrigerated.

It is also an object to be able to provide pellets having different buoyancy characteristics so that they will float instead of sinking, or may sink gradually, or may seek different depths.

An additional object is to provide a pellet having such desirable attributes which can be produced economically with consistent characteristics.

The foregoing objects can be accomplished either by mixing settable gels with the pellet material, or by coating preformed pellets with such settable gel material. Coatings formed by such gels provide firm but soft and flexible consistency. The settable gels may be alginate or guar gum set by an aqueous solution of calcium chloride, or may be gum tragacanth, pectin or gelatin.

BRIEF DESCRIPTION OF THE DRAWINGS

FIG. 1 is an elevation of schematic equipment that can be used for the production of coated pellets according to the present invention.

DETAILED DESCRIPTION

The body of the pellets utilized for the present invention may be composed of conventional fish feed pellet nonalgin material, as follows:

|  | Weight |
| --- | --- |
| Protein | 80.0% to 95.0% |
| animal protein selected from | |
|   fish meal | |
|   herring meal | |
|   wet fish mix | |
|   crab meal | |
|   dried whey | |
|   dried blood | |
|   dried blood meal | |
| vegetable protein selected from | |
|   wheat flour | |
|   wheat middlings | |
|   wheat germ meal | |
|   soy flour | |
|   soy bean meal | |
|   cottonseed meal | |
|   corn meal | |
|   tapioca starch | |
| Oil | 5.0% to 20.0% |
| fish oil selected from | |
|   herring oil | |
|   menhayden oil | |
| Fortifying Ingredients | less than 1.0% |
| trace minerals | |
| vitamins | |
| choline chloride | |
| ascorbic acid | |
| Binder | 0.0% to 4.0% |
| ligninsulfonate | |

Pellets can be made from the foregoing ingredients by a variety of different pelletizing machines which are commonly used in the feed industry. Such machines may form coherent pellets by molding them under pressure in mold cavities or by extrusion. The lignosulfonate binder provides cohesiveness for the other materials. In the formation of the pellets, the nonaqueous ingredients are mixed into a dough by the inclusion of from 10 percent to 35 percent of water depending upon the consistency of the pellet desired.

The present invention provides a coating for the pellets composed principally of gel material and gel-setting material although, where a larger proportion of water is used in the formation of the pellet dough, it may be desirable to include some settable gel material in the body-dough mixture itself.

Alternatively, settable gel can be mixed with the pellet material itself and gel-setting material can be applied to the exterior of the pellet or delayed action gel-setting material can actually be incorporated in the pellet with gel material. Whether the gel material and gel-setting material are provided only in the pellet coating or throughout the body of the pellet, the set gel in the coating or in the outer portions of the pellet forms a firm surface that is soft and flexible, making the pellet palatable to fish. Moreover, the coating or outer portion of the pellet is coherent and does not readily disintegrate either in dry form or in water The coating or outer portion of the pellet may be formed by the interaction of settable gel material, i.e. material that is settable to form a gel, and gel-setting material, i.e. material that will interact with the settable gel material to form a gel. While the settable gel material could be alginate, pectin, gum tragacanth, guar gum or gelatin, the preferred gellable material is sodium alginate. Also, while various gel-setting agents could be used in conjunction with the settable gel material, a preferred gel-setting material is calcium chloride.

The sodium alginate can be mixed with water in the ratio of 2 percent alginate to 98 percent water by weight and this alginate-water mixture is sprayed onto the surface of a preformed pellet, or the preformed pellet is otherwise drenched with the settable gel aqueous liquid. Immediately after the application of the settable gel to the surface of the pellets, gel-setting material is applied to the surface of the pellets such as by a spray. Such spray may be a mixture of 10 percent calcium chloride and 90 percent water by weight.

While the coating can consist only of the settable gel material and the gel-setting material, such coating can serve as a vehicle for additional oil, such as fish oil. The amount of oil supplied in the coating can be 5 percent to 10 percent of the weight of the pellet. Such oil will serve to plasticize the coating and make it softer. Moreover, the oil may be of different types such as coconut oil, fat or tallow, which can alter the specific gravity of the pellet.

The pellet-coating material may also serve as a vehicle for preservative for the pellet material, such as aldehyde, propylene oxide, ethylene oxide, propylene glycol, propionic acid, sulfur dioxide or carbon dioxide. The aldehyde used should be an edible aldehyde such as vanillin, anisaldehyde or butyraldehyde.

The specific gravity of the pellet can be adjusted to less than 1 so that the pellet will float or to a value slightly greater than 1 so that the pellet will sink slowly in water of different densities, not only by a judicious selection of the type and quantity of oil included in the body of the pellet and in its coating, but the settable gel material and water mixture can be aerated by beating it prior to applying it to the surface of the pellets so that minute air bubbles will be trapped in the coating as it is set by the gel-setting material applied to the surface of the pellets immediately after the settable gel material is applied to increase the buoyancy of the pellet.

The amount of air trapped in the coating containing algin can be altered by varying the viscosity of the algin selected to be used. Low viscosity algin, for example, in a one-percent aqueous solution will retain much less entrained air than a one-percent aqueous solution of high-viscosity algin. Where feed is to be used in fresh water or water which is only slightly salty and it is desired for the feed pellets to float at or just beneath the surface of the water, high-viscosity algin can be used and air can be entrained in the gel by aerating it, either by beating the gel or by bubbling air through it or both, before it is applied to the surface of the pellets as a coating and the algin is set quickly thereafter by application of gel-setting material. A further option would be to include in the pellet mixture material which would effervesce to produce bubbles on contact of the pellet with salt water.

An alternative expedient for providing a desired specific gravity of the pellets is by selecting the amount of water used in making the pellets and the amount of water removed thereafter in drying the pellets. As stated above, the amount of water used in making the pellets can be from ten percent to thirty-five percent of the pellets by weight. When a greater proportion of water is included in a pellet, the physical size of the pellet is increased or its density is reduced. Setting of the alginate in the coating or surface portion of the pellet will provide a surface layer through which water vapor can escape from the body of the pellet when the pellet is dried, preferably by subjecting it to a heated atmosphere, but the physical size of the pellet will remain greater or its density will be reduced to a greater extent than if it had been made with less water. Water cannot enter the interstitial spaces left by water evaporated from the pellets while they are being dried because the set alginate of the coating or outer portion of the pellet will provide a barrier substantially impermeable by water in a short period of time, such as a few hours. The specific gravity of the pellets will also be affected by the degree of drying which will regulate the amount of water vapor removed from the pellets. The more water vapor removed by drying, the lower will be the specific gravity of the pellets. Conversely, if less water is removed from the pellets by drying, the greater will be their specific gravity.

The specific gravity of the feed material used in making the pellets specified above, namely, animal protein and vegetable protein which constitutes most of the ingredients of the pellets, when dry is on the average about 1.4. When such material is mixed with ten percent water by weight, formed into pellets, the pellets coated with algin gel material and the pellets dried to evaporate approximately one-half of the water from them, the specific gravity is reduced to about 1.3. If the feed components of the bait are mixed with twenty-five percent of water by weight and pellets are formed from such mixture, coated with an algin gel material coating and dried to evaporate about one-half of the water from them, the resulting pellets will have a specific gravity of about 1.15 to 1.20. If pellets having an initial water content of twenty-five percent are dried to retain a water content of about twenty percent, or pellets having an initial water content of about thirty-five percent are dried to retain a water content of approximately thirty percent, the resulting pellets will have a specific gravity of approximately 1.0.

The pellets formed with feed material mixed with twenty-five percent of water are either larger than the feed pellets made with only ten percent of water or the density of the feed pellets made with twenty-five percent water is less than the density of the feed pellets made with ten percent water. In either case, after being dried to the same degree, the specific gravity of the dried pellets made with more water is less than the specific gravity of the dried pellets made with less water.

If it is desired to adjust the specific gravity of the pellets by varying the oil content of the pellet as a whole or of the coating, the use of a given proportion of lighter oil will reduce the specific gravity more than using the same proportion of heavier oil. The specific gravity of oil selected could vary from 0.6 to 0.9. Also, the total quantity of oil used could vary from five percent to twenty-five percent of the pellet weight. The specific gravity of the pellets could be adjusted simply by varying the type and quantity of oil used, or the type and quantity of oil used could be combined with aeration of the algin and selection of the quantity of water used in the pellet mixture and the degree of drying of the pellets to produce the desired specific gravity of the pellets.

Specific examples of preformed pellets made in accordance with the present invention are illustrated by the following examples:

EXAMPLE 1

|  | Weight |
| --- | --- |
| fish meal | 50.0% |
| wheat flour | 9.6% |
| soy flour | 15.0% |
| dried blood flour | 10.0% |
| fish oil | 12.0% |
| ligninsulfonate | 2.0% |
| trace mineral premix | 0.5% |
| vitamin premix | 0.6% |
| choline chloride | 0.225% |
| ascorbic acid | 0.075% |

Water in the amount of 10 percent to 25 percent of the foregoing ingredients by weight may be mixed with the farinaceous pelletizing ingredients to form a dough which may be formed into pellets by being pressed in a mold or by being extruded.

The surfaces of the preformed pellets are sprayed with a settable gel mixture of 1 percent by weight of sodium alginate in warm water. The amount of such settable gel material sprayed onto the surface of the pellets should be approximately 5 percent of the weight of the pellets. Such spraying may be accomplished while the pellets are free-falling or are being transported by a conveyor. Immediately thereafter the pellets are sprayed with gel-setting material which may be 10 percent by weight aqueous solution of calcium chloride. The amount of such gel-setting material sprayed onto the pellets may be approximately 5 percent of the weight of the pellets. Following the two pellet-spraying operations, the pellets may be passed through a drying atmosphere to facilitate setting of the coating.

EXAMPLE 2

The pelletizing material may consist of the following ingredients:

|  | Weight |
| --- | --- |
| fish meal | 20.0% |
| wheat middlings | 37.05% |
| wheat flour | 5.0% |
| soybean meal | 15.0% |
| dried blood meal | 10.0% |
| fish oil | 10.0% |
| ligninsulfonate | 2.0% |
| trace mineral premix | 0.1% |

-continued

|  | Weight |
| --- | --- |
| vitamin premix | 0.6% |
| choline chloride | 0.175% |
| ascorbic acid | 0.075% |

The foregoing pelletizing ingredients, except for the oil, may be mixed with 10 percent to 25 percent of water into a dough and pellets formed by being pressed in a mold or by being extruded.

The gel coating is formed by mixing 2 percent of sodium alginate with water and spraying such settable gel material onto the surface of the pellets, or otherwise drenching the surfaces of the pellets, using an amount of settable gel material equal to approximately 8 percent of the weight of the pellets. When the coating material on the pellets has thickened, 1 percent by weight of bentonite and ½ percent by weight of ammonium hydroxide are blended with the 10 percent of fish oil specified in the pellet material formula. Such mixture is applied to the pellets as a coating over the settable gel material. The pellets are then immediately sprayed with a gel-setting material consisting of a 10 percent by weight solution of calcium chloride in water. An amount of such solution equal to approximately 1 percent by weight of the pellets of such gel-setting material should be applied to the pellets. The pellets may then be subjected to a heated atmosphere to facilitate drying and setting of the coating.

The pellets made according to the procedure of Example 2 have their entire oil content in the coating, which deters solution or dissipation of the pellet material into water surrounding the pellet. Also, the presence of the oil in the coating will plasticize the coating to soften its consistency so as to make it more palatable for fish.

For either type of pellet resulting from Example 1 and Example 2, if the moisture content of the pellet is high, such as 15 percent by weight of water or more, the settable gel coating material can incorporate edible aldehyde such as vanillin, anisaldehyde or butyraldehyde. The settable gel coating material may, for example, consist of 2 percent by weight of alginate, 18 percent by weight of aldehyde and 60 percent by weight of water. The amount of settable gel material applied to the surface of preformed pellets should be equal to at least approximately 10 percent to 15 percent of the weight of the uncoated pellets.

An alternative procedure for preserving pellets having a moisture content of 15 percent or more is to coat the pellets with a settable gel coating material that does not incorporate aldehyde and then smoke the pellets with smoke from burning grease that contains the aldehyde acrolein.

EXAMPLE 3

Pellets made from the following ingredients may be particularly suitable for feeding shrimp:

|  | Weight |
| --- | --- |
| herring meal | 29.0% |
| crab meal | 4.0% |
| wet fish mix | 30.0% |
| dried whey | 5.0% |
| wheat germ meal | 4.5% |
| cottonseed meal | 15.0% |
| corn meal | 4.0% |

-continued

|  | Weight |
| --- | --- |
| herring oil | 6.5% |
| choline chloride | 0.5% |
| vitamin premix | 1.5% |
| Total | 100.0% |

Pellets may be made from this material by mixing it into a dough by the addition of 10 percent to 25 percent by weight of water. Such pellets may be coated with a settable gel coating material in the manner described in connection with Example 1.

Representative equipment for producing and coating pellets includes storage bins a, b, c, etc. having hopper bottoms for the various dry ingredients to be included in the pellet mix. Supply pipes from the several storage bins feed into the common line 2 through which the dry material passes to the ribbon blender 3. Such supply pipes may be screw conveyors. The oil and water components are also supplied to such blender to enable the blender to form the pellet material into a dough.

From the ribbon blender, the dough is transferred by the screw conveyor 4 to a multiple strand extruder 5. One or more knife blades 6 extending radially from a rotating shaft 7 sever the strands extruded from the machine 5 into pellets 8 which fall onto a collecting conveyor 9. During such fall the settable gel material may be sprayed onto the preformed pellets followed by spraying onto them the gel-setting material. Drying and setting of the coating on the pellets can be facilitated by passing the conveyor 9 through a heated drying atmosphere following which the pellets are dumped from the discharge end of the conveyor into a freeze blast air conveyor 10 where the pellets are frozen. From such air conveyor, the pellets are discharged into a bagger 11 which deposits the completed pellets into bags 12 for storage and transportation to the location where the feed is to be used.

During the bagging operation, carbon dioxide or nitrogen can be supplied to the bags so that when they are sealed the pellets will remain in an inert atmosphere to promote preservation until the bags are opened at the location where the feed is to be used.

I claim:

1. The process of making palatable marine animal feed pellets which comprises mixing nonalgin feed material principally in the form of meal or flour with water into a dough, forming preformed coherent pellets of the feed material dough and applying to the exterior of such preformed pellets settable alginate and gel-setting material for setting the alginate and thereby forming on the preformed pellets a firm surface that is soft and flexible and which will not readily disintegrate either when dry or in water.

2. The process of making palatable marine animal feed pellets which comprises mixing nonalgin feed material principally in the form of meal or flour with water into a dough, forming preformed coherent pellets of the feed material dough, coating the preformed pellets with a coating containing fish oil and alginate, and applying gel-setting material for setting alginate and thereby forming a firm surface that is soft and flexible and which will not readily disintegrate either when dry or in water.

3. The process defined in claim 2, in which the coating contains fish oil in an amount such that the specific gravity of the feed pellets is less than 1 or slightly greater than 1.

4. The process of making palatable marine animal feed pellets which comprises mixing feed material principally in the form of meal or flour with water into a dough, forming preformed coherent pellets of the feed material dough, and coating the preformed pellets with a coating containing edible aldehyde and alginate for forming a firm surface that is soft and flexible and which will not readily disintegrate either when dry or in water.

5. The process defined in claim 4, which the edible aldehyde is selected from the group consisting of vanillin, anisaldehyde and butyraldehyde.

6. The process of making coated marine animal feed pellets which comprises mixing nonalgin feed material principally in the form of meal or flour with water into a dough, forming preformed coherent pellets of the feed material dough, and applying to the exterior of such preformed pellets a mixture of alginate and water and an aqueous calcium chloride solution to set the alginate for forming on the preformed pellets a firm surface that is soft and flexible and which will not readily disintegrate either when dry or in water.

7. The process of making marine animal feed pellets which comprises mixing nonalgin feed material principally in the form of meal or flour with water into a dough, forming preformed coherent pellets of the feed material dough, coating the preformed pellets by applying to the exterior of the preformed pellets settable gel material, and after such settable gel material has thickened applying a further coating containing bentonite, ammonium hydroxide and oil followed by applying to the surface of the pellets gel-setting material, thereby forming on the preformed pellets a firm surface that is soft and flexible and which will not readily disintegrate either when dry or in water.

8. Marine animal feed pellets comprising preformed coherent palatable pellets of nonalgin feed material principally in the form of meal or flour, and a coating covering said preformed coherent pellets which coating contains alginate which has been set by gel-setting material and fish oil and provides a firm pellet surface that is soft and flexible and which will not readily disintegrate either when dry or in water.

9. Marine animal feed pellets comprising coherent bodies composed of a major portion by weight of nonalgin feed material principally in the form of meal or flour, said bodies having, at least in their outer portions, settable alginate which has been set by gel-setting material to provide a firm pellet surface that is soft and flexible and which will not readily disintegrate either when dry or in water.

10. Marine animal feed pellets defined in claim 9, in which the set gel contains oil.

11. Marine animal feed pellets comprising coherent bodies including settable gel material and a major portion by weight of nonalgin feed material principally in the form of meal or flour, which settable gel material in the outer portion of such bodies has been set by gel-setting material, said coherent bodies having a firm surface that is soft and flexible and which will not readily disintegrate either when dry or in water.

12. Marine animal feed pellets comprising coherent bodies including a major portion by weight of nonalgin feed material principally in the form of meal or flour with outer portions containing a gel which has been set by get-setting material and fish oil, said coherent bodies 13. The process of making palatable marine animal feed pellets which comprises mixing feed material principally in the form of meal or flour with water into a dough, at least a major portion of which feed material is of nonalgin type, forming coherent pellets of the feed material dough having, at least in their outer portions, settable alginate, and setting alginate by applying gel-setting material to the pellets for forming a firm pellet surface that is soft and flexible and which will not readily disintegrate either when dry or in water.

14. The process of making palatable marine animal feed pellets which comprise mixing feed material principally in the form of meal or flour with water into a dough, at least a major portion of which feed material is of nonalgin type, forming coherent pellets of the feed material dough having, at least in their outer portions, settable alginate, and applying gel-setting material to the exterior of the pellets for setting alginate in the outer portion of the pellets and thereby forming a firm pellet surface that is soft and flexible and which will not readily disintegrate either when dry or in water.

15. The process of making palatable marine animal feed pellets which comprises mixing feed material principally in the form of meal or flour and settable alginate with water into a dough, at least a major portion of which feed material is of nonalgin type, forming coherent pellets from such dough, and applying gel-setting material to the exterior of the pellets for setting alginate in the outer portion of the pellets and thereby forming a firm pellet surface that is soft and flexible and which will not readily disintegrate either when dry or in water.

16. The process of feeding marine animals with palatable feed pellets which comprises mixing feed material principally in the form of meal or flour with water into a dough, at least a major portion of which feed material is of nonalgin type, forming coherent pellets of the feed material dough having, at least in their outer portions, settable alginate, setting the settable alginate by applying gel-setting material to the pellets for forming a firm pellet surface that is soft and flexible and which will not readily disintegrate either when dry or in water, and supplying such feed pellets to a body of water containing marine animals.

17. The process of feeding marine animals with palatable feed pellets which comprises mixing feed material principally in the form of meal or flour with water into a dough, at least a major portion of which feed material is of nonalgin type, forming coherent pellets of the feed material dough having, at least in their outer portions, settable gel material, setting the settable gel material by applying gel-setting material to the pellets for forming a firm pellet surface that is soft and flexible and which will not readily disintegrate either when dry or in water, and supplying such feed pellets to a body of water containing marine animals.

18. The process of making marine animal feed which comprises forming pellets of feed material principally in the form of meal or flour, coating the pellets with settable alginate, and setting the alginate by applying gel-setting material to the pellets to form a coating on the pellets by contacting the alginate with setting material.

19. The process defined in claim 18, including providing oil in the coating.

20. Marine animal feed pellets comprising nonalgin feed material principally in the form of meal or flour, having an exterior containing settable gel material which has been set by gel-setting material and a coating containing bentonite, ammonium hydroxide and oil, and having a firm surface that is soft and flexible and which will not readily disintegrate either when dry or in water.

21. Marine animal feed pellets comprising nonalgin feed material principally in the form of meal or flour, having an exterior containing settable gel material which has been set by gel-setting material, bentonite, ammonium hydroxide and oil.

22. The process of making marine animal feed pellets which comprises mixing nonalgin feed material principally in the form of meal or flour with water into a dough, forming preformed coherent pellets of the feed material dough, coating the preformed pellets by applying to the exterior of the preformed pellets settable gel material, and after such settable gel material has thickened applying a further coating containing bentonite, ammonium hydroxide and oil followed by applying to the surface of the pellets gel-setting material.

23. The process of making palatable marine animal feed pellets which comprises mixing feed material principally in the form of meal or flour with water into a dough, at least a major portion of which feed material is of nonalgin type, forming coherent pellets of the feed material dough having, at least in their outer portions, settable algin gel material, setting algin gel matrial by applying gel-setting material to the pellets for forming a firm pellet surface that is soft and flexible which will not readily disintegrate either when dry or in water and which is permeable by vapor produced within the pellets but substantially impermeable by water from the exterior of the pellets, and drying the pellets and thereby removing water vapor from the interior of the pellets for reducing the specific gravity of the pellets.

24. The process defined in claim 23, which comprises, after forming the coherent pellets of the feed material dough, applying settable algin gel material to the pellets by coating their outer portions with algin gel material and setting such algin gel material by thereafter applying gel-setting material to the surface of the pellets.

25. The process defined in claim 23, including heating the pellets for vaporizing water in their interior for expulsion through the set algin material of the pellet surface.

* * * * *